July 4, 1967

A. ROBBINS 3,329,946

ELECTRO-OPTICAL MONITOR SYSTEMS

Filed June 19, 1964

INVENTOR.
ALEX ROBBINS

BY

ATTORNEY

INVENTOR.
ALEX ROBBINS
ATTORNEY

July 4, 1967  A. ROBBINS  3,329,946
ELECTRO-OPTICAL MONITOR SYSTEMS
Filed June 19, 1964  6 Sheets-Sheet 5

INVENTOR.
ALEX ROBBINS
BY Leo Hauser
ATTORNEY

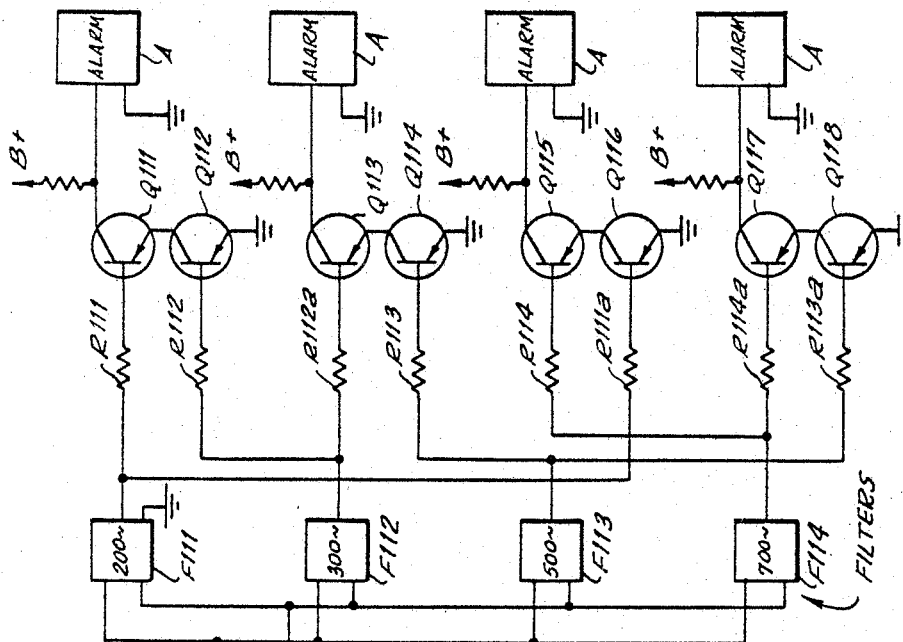
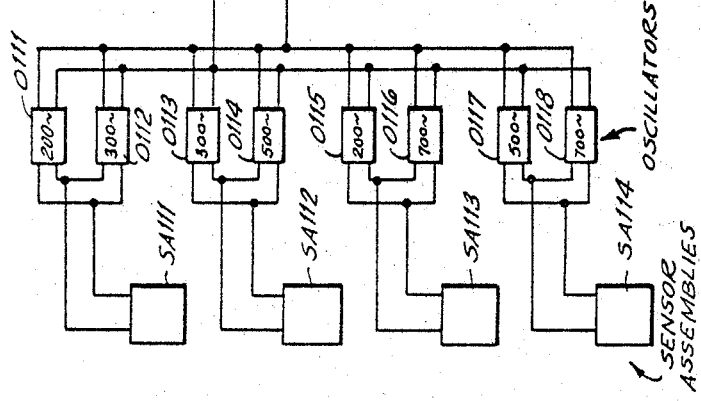

United States Patent Office
3,329,946
Patented July 4, 1967

3,329,946
ELECTRO-OPTICAL MONITOR SYSTEMS
Alex Robbins, 147—33 84th Drive,
Jamaica, N.Y. 11435
Filed June 19, 1964, Ser. No. 376,479
2 Claims. (Cl. 340—258)

This invention relates to electro-optical monitor systems, and particularly to electro-optical alarm systems, for example, a burglar alarm, responding to an intruder passing through a supervised area.

Conventional electro-optical monitor systems employ a light beam focusing upon a photo-electric cell which actuates an alarm when the light beam is interrupted.

Such systems have the disadvantage of clearly revealing themselves to potential intruders and thereby permitting themselves to be by-passed. On the other hand, actuating conventional protective photo-electric systems with ambient light may result in false-alarms when the ambient light conditions change due to atmospheric changes, time of day, or the like. Thus, a monitor system set to actuate whenever the light incident upon a photo-sensor decreases below a predetermined value would be unsatisfactory because such a decrease may be caused by other than intruders.

Accordingly, it is an object of this invention to provide a light responsive monitor system for exposing the presence of an intruder which system is itself substantially imperceptible.

It is another object of the invention to provide a supervisory electro-optical system for exposing the presence of intruders which in its quiescent condition is actuated by ambient light but nevertheless can distinguish intruders from the expected variations in the intensity of the ambient light.

Another object of the invention is to provide an area supervising alarm system capable of being hidden from a potential intruder and having such an arrangement that sensors supervising zones which altogether embrace only a small portion of the area to be protected will nevertheless protect the entire area. By such means an intruder would set off an alarm despite the fact that the entire area to be protected is not completely supervised.

Still another object of the invention is to provide a photo-electric alarm system actuated by ambient light for recognizing an intruder when the ambient light is dim as well as when it is bright without requiring adjustment or control to accommodate the varying light conditions.

According to a feature of this invention, the ambient light from a predetermined area or zone is focused upon a photo-electric sensor, for example, a photo-resistor or a photo-cell, having an electrical output corresponding to the intensity of light to which it is exposed, and the sensor is connected to an electrical time-change responsive circuit which distinguishes changes in electrical output of the sensor exceeding a predetermined value for a predetermined time. An alarm is connected to the time-change responsive circuit to be actuated only when this circuit has distinguished such electrical outputs corresponding to changes of light in the area to which the sensor is exposed which are faster than those normally anticipated. Such fast changes would occur due to a passing intruder either momentarily shading or brightening the sensor.

According to another feature of the invention, the time-change responsive circuit is comprised of an amplifier having a band-pass filter. According to still another feature of the invention, the time-change responsive circuit is included as part of an oscillator circuit serving to attenuate the oscillator feed-back and therefore to change the oscillator output when the light variation to which the sensor is exposed is faster than the expected change in the ambient light, but to sustain oscillation when the change is slower.

According to another feature of the invention, a plurality of photo-cells are focused over separate zones of an illuminated area and the respective sensors actuate respective alarms at a remote location. Yet another feature of the invention involves modulating with each zone-focused photo-cell two or more oscillators which have time-change responsive circuits and which generate a frequency combination different from oscillators of other zone-focused photo-cells, multiplexing all the frequencies over a single transmission-line pair to a remote supervisory board, and there with filters logically recombining the original frequency combinations so the modulations can be detected and alarms energized.

A more complete understanding of the invention may be had from the following detailed description of several embodiments of the invention when considered in connection with the accompanying drawings wherein:

FIG. 11 is a schematic diagram of an indicator system similar to FIGS. 6 and 8 but embodying other features of the invention.

Figure 1:
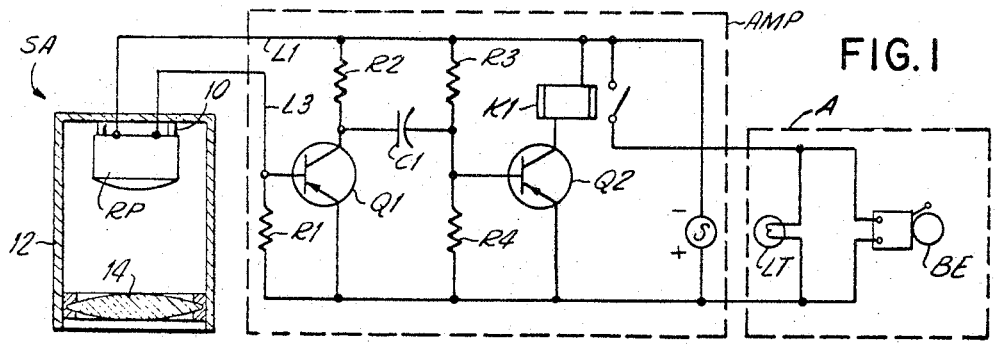
FIG. 1 is a schematic and partially cross-sectional showing of light-responsive indicator system with a single sensor embodying features of this invention.

In FIG. 1 a sensor assembly SA which may be mounted in a doorway or in a ceiling for supervising an area includes a photo-resistor RP mounted by means of a clip 10 along the axis of a tube 12. Tube 12 is closed at the end in which the photo-resistor RP is mounted, and possesses a lens 14 at its open end for focusing light from the outside of the tube, that is to say from the area to be supervised by the photo-resistor. This is a typical arrangement of the sensing assembly according to the invention. Installation of the sensing assembly for observation and supervision is rendered more convenient by inclusion of a pilot lamp inside the tube or housing 12, and beaming the light from this pilot lamp during installation of the sensing assembly at the supervised area. This renders proper adjustment of the assembly for proper observation comparatively easy. The sensing assembly forms part of the electro-optical system which includes an amplifier AMP and an alarm A.

The photo-resistor RP responds to an increasing intensity of light by decreasing its resistance. A source S in the amplifier AMP energizes the photo-resistor RP through a series connected 100 ohm resistor R1. A line L2 connects the resistor R1 to the positive lead of the source S. A line L1 connects the photo-resistor RP to the negative lead of the source S and a line L3 connects the resistor R1 to the other terminal of the photo-resistor RP. Thus, the photo-resistor and the resistor R1 form between the terminals of the voltage source S a variable voltage divider whose output voltage at their juncture depends upon the exposure of the photo-resistor RP to light. Connected in the amplifier to the juncture of the photo-resistor RP and the resistor R1 is the base of a PNP transistor Q1 possessing an emitter connected to the positive lead L2. The collector of transistor Q1 connects to the negative lead L1 by means of a 3300 ohm resistor R2.

The transistor Q1 and its associated circuitry forms the first stage of the amplifier AMP, the second stage of which comprises the PNP transistor Q2. The emitter of transistor Q2 connects directly to the positive lead L2, and the collector of transistor Q2 connects to the negative lead L1 through the winding of a relay K1. A 33,000 ohm resistor R3, connected to the lead L1, and a 1,000 ohm resistor R4, connected to the positive lead L2, both connect to the base of transistor Q2 and form a voltage divider between the leads L1 and L2 for biasing the transistor Q2 into continuous conduction. Coupling the two amplifier stages, specifically coupling the collector of transistor Q1 with the base of transistor Q2 is a 1.0 microfarad capacitor C1.

The relay K1 possesses normally closed contacts which open when the winding of relay K1 is energized by the normally flowing current through the emitter-collector circuit of transistor Q2. The contacts are connected in series, between the leads L1 and L2, with the alarm device A. When lack of current through the emitter-collector circuit of transistor Q1, and hence the winding of relay K1, permit them to close the contacts set off alarm A. The alarm A comprises a bell BE and a light LT connected in parallel.

In operation the transistors Q1 and Q2 are both biased into a conducting state by virtue of the respective voltage dividers RP, R1 and R3, R4 applying to the bases of transistors Q1 and Q2 voltages more negative than the respective emitter voltages. The intensity of light to which photo-resistor RP is exposed regulates the degree of conduction of transistor Q1 so that when photo-resistor RP is exposed to bright light, thereby decreasing its impedance, the conduction in the emitter-collector circuit of transistor Q1 increases corresponding to the more negative bias of the base of transistor Q1. When subjected to dim light the increased resistance of photo-resistor RP renders the voltage at the junction of the voltage divider RP, R1 more positive thereby decreasing the current in transistor Q1. Regardless of the value of current through transistor Q1, the current through the emitter-collector circuit of transistor Q2 is held relatively constant by the voltage divider R3, R4 thus neutralizing alarm A by providing sufficient current to energize the relay K1 and to hold open its contacts. With the contacts of the relay K1 kept open, the alarm A connot "sound." Only an incoming signal at the base of transistor Q2 would disturb this neutralized condition. However, due to the capacitor C1 coupling the collector of transistor Q1 to the base of transistor Q2, only alternating voltage components or voltages varying faster than a predetermined rate can disturb the bias of transistor Q2 and thereby affect the energized condition of relay K1.

The conduction of transistor Q1 varies directly with the light to which the photo-resistor RP is exposed. Thus, if the change in light falling upon the photo-resistor is fast enough to be above the low-frequency cut-off of the circuit associated with capacitor C1 the current change in transistor Q1 and the corresponding voltage change at its collector will be sufficient to vary the conduction in transistor Q2. This will de-energize the relay K1 and release its contact so as to actuate the alarm. Fast changes in light, as may be caused for example by a person passing through the supervised zone will actuate the relay and slow changes in ambient light will not.

With the photo-resistor RP and the sensor assembly SA located in a doorway or in a ceiling for observing the entrance or departure of persons, the value of capacitor C1 is chosen so that slow changes in ambient light, introduced for example by changes from sunlight to darkness do not affect the alarm. However, the value of capacitor C1 is such that passage of a person through the supervised zone will vary illumination of the photo-resistor RP with sufficient speed to actuate the alarm A. This will occur regardless of whether the individual being supervised constitutes a dimly lit person in a sunlit area or a well illuminated person in a dimly lit zone. The sensitivity of the amplifier may be varied by the variation of the resistor R4, R1, R3 or R2 or by a series resistor in the line L3 so that the alarm will be actuated only by large objects and not by small objects, such as rodents which may appear in a warehouse.

Figure 2:
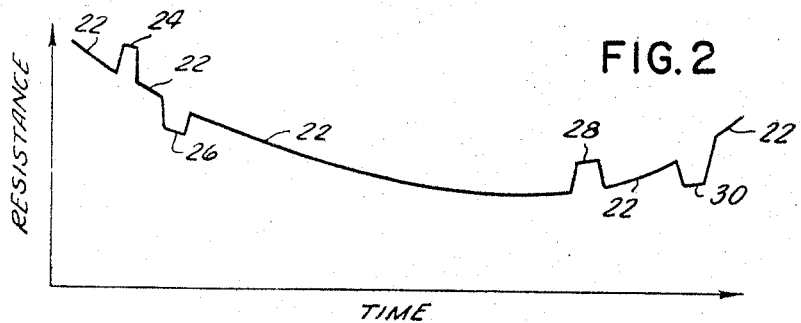
FIG. 2 is a time graph showing the variation of resistance in the sensor of FIG. 1.
Figure 3:
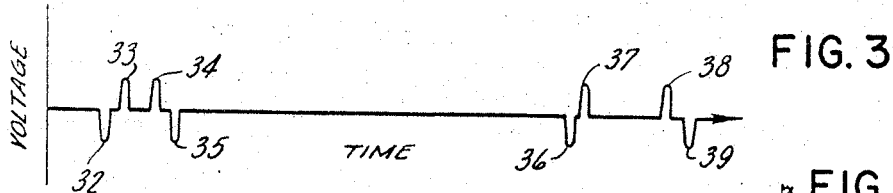
FIG. 3 is a time graph of the voltage biasing the alarm amplifier when the sensor in FIG. 1 has been exposed to the light conditions in FIG. 2 and the voltages have passed through the time-change responsive circuit.

A graph showing the typical response of the resistor RP to changes in the light to which it is exposed is shown in FIG. 2 where the abscissa represents units of time and the ordinate represents the resistance of the photo-resistor RP. FIG. 3 represents the voltage response, at the base of transistor Q2, to the resistance conditions at the photo-resistor RP shown by the curve in FIG. 2. In FIG. 2 the drooping and rising resistance level 22 corresponds to a gradually varying ambient light. The interruptions in 22 represented by the wave forms 24, 26, 28 and 30 corresponds respectively to objects passing in and out of the supervised zone of the resistor RP respectively shading, brightening, again shading, and again brightening the photo-resistor RP relative to the ambient light. The rise and fall times for each object passing in the supervised zone are sufficiently short to pass through capacitor C1 to the base of transistor Q2 thereby producing the pulses at the base of transistor Q2 shown in FIG. 3. The respective pulses are identified by the FIGURES 32 to 39 and possess the polarities shown as a result of phase reversal in the transistor Q1. The positive pulses 33, 34, 37 and 38 corresponding to each intruder 24, 26, 28 and 30 deactivate the winding of K1 so as to set off the alarm. It will be noted that the resistance drop from the level 24 to the level 22 is sufficient to create an alarm activating pulse 33 despite the fact that the level 22 subsequent to the interruption 24 is higher than the minimum level of the ambient light represented by the curve 22.

Figure 4:
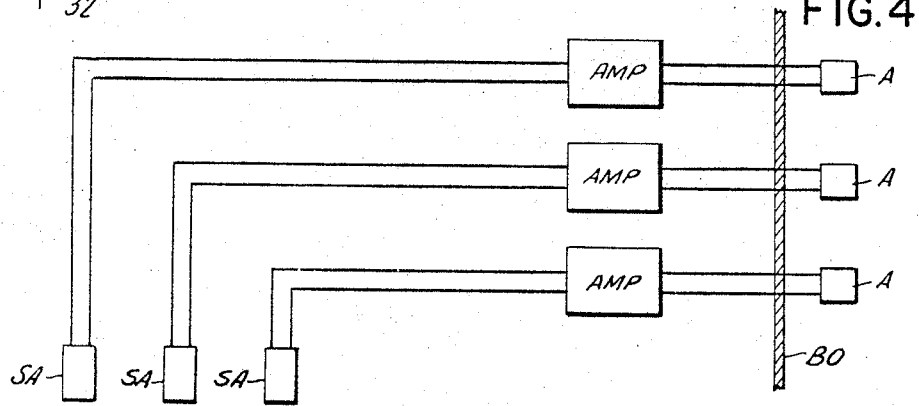
FIG. 4 is a schematic circuit diagram of an electro-optical alarm system wherein a plurality of sensors are positioned remote from a control board holding a plurality of corresponding alarms.

The invention contemplates connecting in a complete system more than one of the systems shown in FIG. 1 to thereby supervise a larger area. The invention further contemplates arranging a supervisory board in a central location remote from the supervised area and possessing a plurality of visual and/or sound types of alarms for display to a watchman or other observer. Such a system is shown in FIG. 4 wherein 3 units SA are separately connected through 3 separate amplifiers AMP corresponding respectively to the amplifier AMP in FIG. 1 and to 3 alarms A corresponding to the alarms in FIG. 1. The alarms A are mounted on a central supervisory board BO where an observer or watchman at a remote location can pinpoint the place at which an unauthorized person moves about. The board is preferably part of a desk unit containing the amplifiers AMP. Each of the sensor assemblies SA may be placed in a separate room or may be distributed throughout several warehouses thereby enlarging the possible application for this system. It is of course understood that this system embodied in FIG. 4 is not limited to 3 sensor assemblies and 3 amplifiers but may be comprised of several dozen such assemblies and amplifiers.

Figure 5:
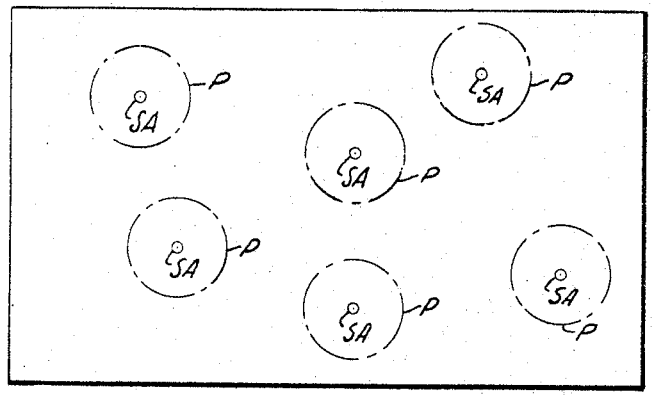
FIG. 5 is a plan view of an area to be supervised illustrating a plurality of sensors and their corresponding sensing zones.

FIG. 5 illustrates the typical locations of 6 sensor assemblies SA in an irregular pattern along the ceiling of a single room to be supervised. In this plan view, the respective circles P surrounding the sensor assemblies SA indicate approximately the extent of sensing coverage at the floor level. This peripheral extent of observation is of course determined by the dimensions of the tube 12 as well as the character of the lens 14. The units are arranged in FIG. 5 in an irregular pattern thereby permitting direct observance of a comparatively small total area encompassed by the circles P while effectively observing the entire area of the room. A person not completely familiar with the location and range of each of the sensor assemblies SA attempting to cross the room would have only a remote possibility of achieving his object without crossing the supervised encircled zones. Each of the sensor assemblies SA is connected to a separate alarm according to the principles illustrated for three of the sensor assemblies in FIG. 4.

A contemplated variation of the system of FIGS. 4 and 5 comprises a plurality of irregularly positioned sensor assemblies in a plurality of separate rooms. The sensor assemblies in each room are connected together in parallel to each other, that is to say the photo-resistors PR of each of these sensor assemblies are connected in parallel and the parallel-connected sensor assemblies of each room connect to respective alarms A, corresponding to each room, through respective band-pass amplifiers AMP.

Figure 6:
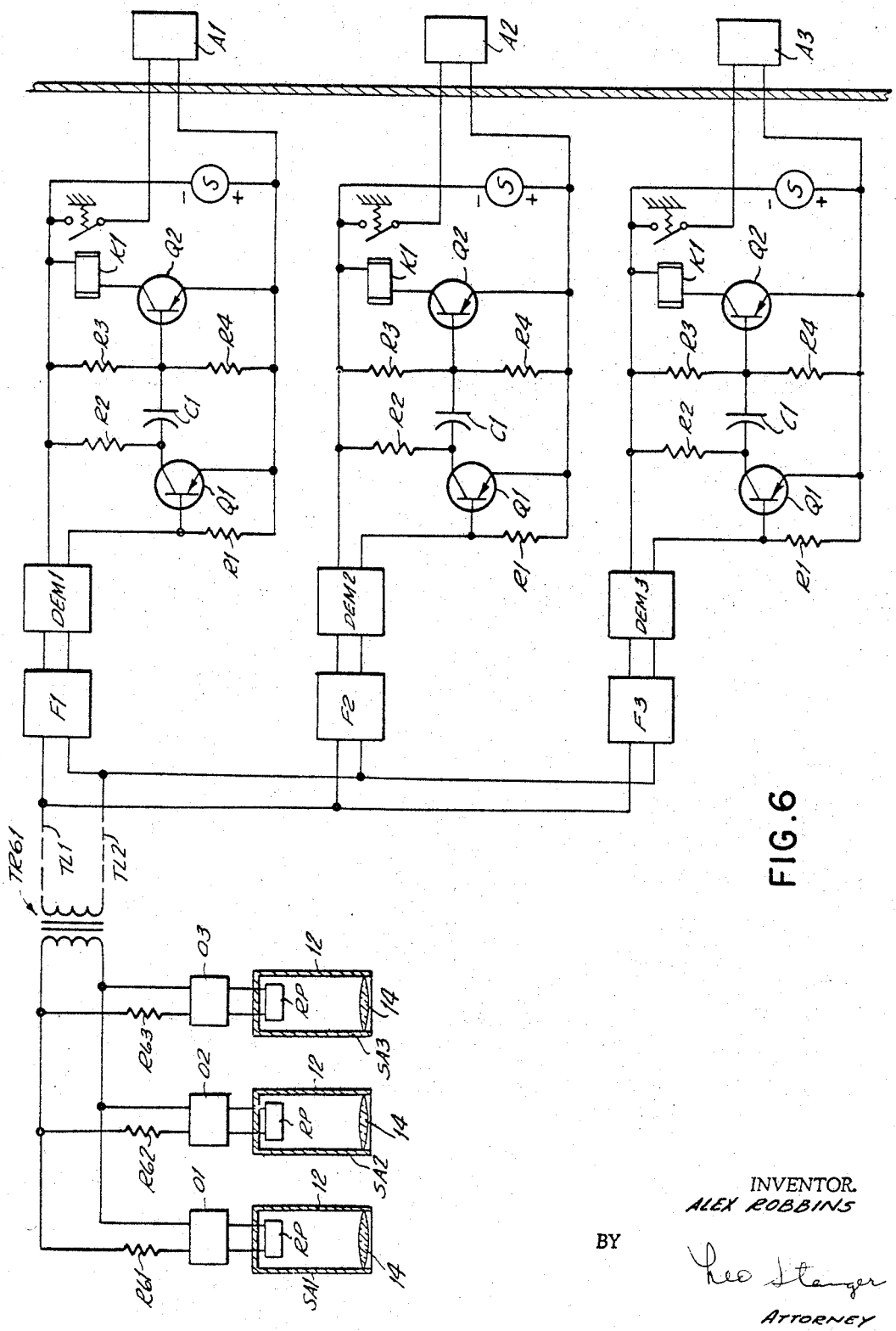
FIG. 6 is a circuit diagram of an electro-optical alarm system similar to that of FIG. 5 and embodying features of the invention, but modified to require only one pair of transmission lines between the sensors and the remote control board.

The embodiment of the invention illustrated in FIG. 6 corresponds to that of FIG. 4 but permits transmission of information from the photo-cells to the alarm observation board by a two wire system. Such a network is extremely desirable when the central observation board is located at a position remote from an observed area comprised of many spaces each supervised by a multiplicity of sensor assemblies. In FIG. 6 the sensor assemblies SA1, SA2 and SA3 correspond respectively to the sensor assembly SA in FIG. 1 or to a plurality of sensor assemblies having their photo-resistors RP connected in parallel. The sensor assemblies SA1, SA2 and SA3 connect respectively to separate oscillators O1, O2 and O3 and modulate these oscillators according to their respective exposure to light. The outputs of the oscillators connect in parallel to a two wire system or transmission lines TL1, TL2 through respective isolating resistors R61, R62, R63 and a common transformer TR61. The resistors R61, R62 and R63 prevent loading and interference between oscillators. The resistors R61, R62, R63 can be used when the oscillators O1, O2, O3 have sufficient power to make up for losses in the oscillator resistors and still provide output for the transmission line which is well above the noise level. The invention contemplates isolating the oscillators O1, O2, O3 with respective emitter-follower outputs in each oscillator or other types of isolation circuits. Each of the oscillators operates at a different frequency, the oscillator O1 operating at a frequency of 200 cycles per second, oscillator O2 at 300 cycles per second and oscillator O3 at 500 cycles per second. At a central location remote from the observed area the line TL1, TL2 connects to 3 pick-off filters F1, F2 and F3 tuned to 200, 300 and 500 cycles per second respectively, which pass their respectively different signals to three demodulators, DEM1, DEM2, DEM3. The demodulators each comprise a diode connected in series with a filter capacitor across which the output is taken. The input to the demodulator is across the series capacitor-diode circuit. The filters and demodulators form respectively the input circuits to 3 amplifiers AMP1, AMP2 and AMP3, each substantially identical to the amplifier AMP in FIG. 1. The filters F1, F2 and F3 respond with a narrow band-pass to their respective frequencies 200 cycles, 300 cycles and 500 cycles.

Figure 7:
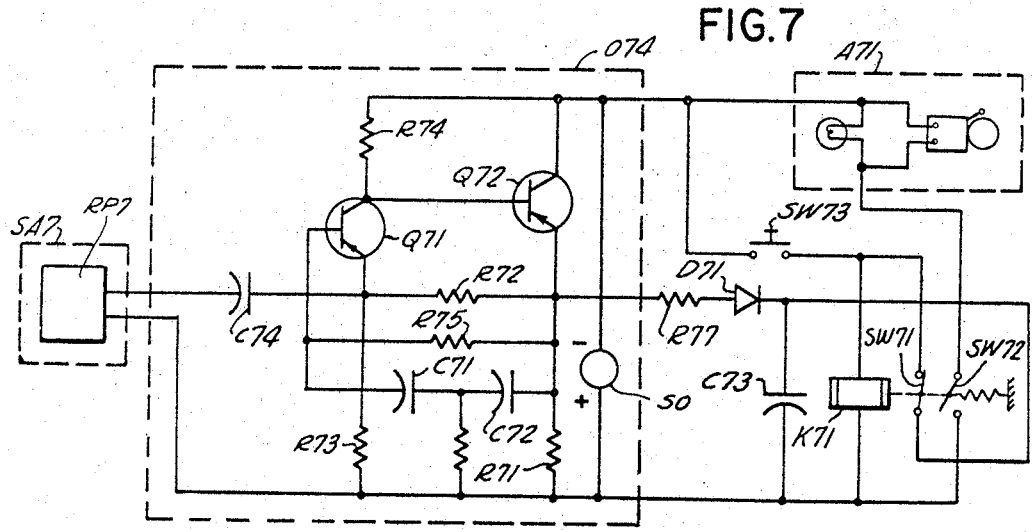
FIG. 7 illustrates another alarm system corresponding to that of FIG. 1.
Figure 8:
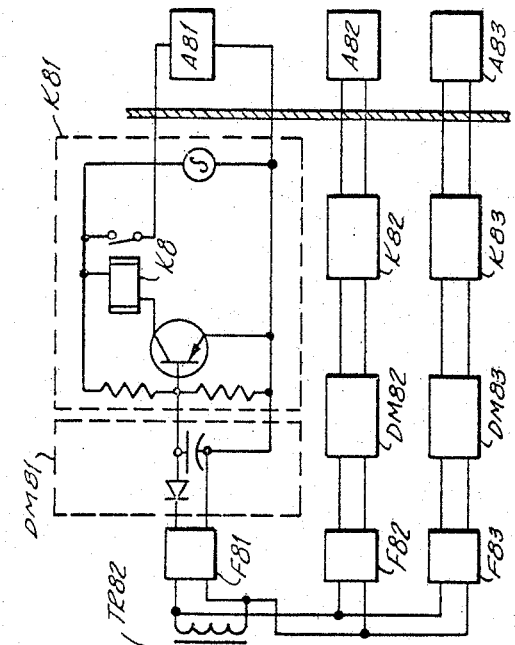
FIG. 8 shows a schematic diagram of a multi-sensor alarm system similar to that of FIG. 6 but utilizing the circuit of FIG. 7.
Figure 8:
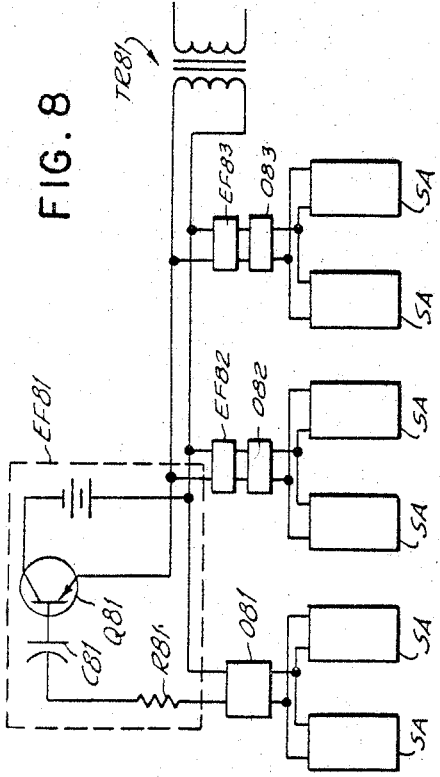

In the system according to FIG. 6 the characteristic enabling the alarm to respond only to fast changes in the light to which the photo-resistors are exposed is incorporated into the amplifiers AMP1, AMP2 and AMP3. It is possible that the time-change responsive characteristic be incorporated in the oscillator rather than in the amplifier. An oscillator capable of responding to fast changes as distinguished from slow changes in light upon an associated photo-resistor is shown in the circuit of FIG. 7 wherein an alarm system similar to that of FIG. 1 is shown. FIG. 8 illustrates a complete system similar to that of FIG. 6 wherein the time-change responsive characteristic is incorporated into the oscillator circuits.

The oscillator of FIG. 7 comprises a pair of transistors Q71 and Q72 coupled directly from the collector of transistor Q71 to the base of transistor Q72. The transistor Q72 is emitter-follower connected between the positive lead L71 and the negative lead L72 from a direct voltage source SO by means of an emitter-resistor R71. A feedback resistor R72 couples the emitter-connected transistor Q72 back to the emitter of transistor Q71 for positive feed-back. The emitter-collector circuit of transistor Q71 is energized from the source SO by means of an emitter resistor R73 and a collector resistor R74. The emitter of transistor Q72 is also coupled back for negative feedback to the base of transistor Q71 by means of a frequency responsive bridge-T filter network comprising capacitors C71, C72, and resistors R75, R76 connected as shown. The oscillator output appears across the resistor R71 by means of a resistor R77, a diode D71 in series with the resistor R77 and a filter capacitor C73 connected to the lead L71 from the diode D71. A relay K71 possesses a winding, normally-open contacts SW71 connecting the winding across capacitor C73 when the contacts are closed, and normally-closed contacts SW2. A manual reset button switch SW73 is adapted to be depressed momentarily and when thus closed connects the winding across the source SO. This energizes the winding and closes the contacts SW71 to thereby connect the winding across capacitor C73 while opening the contacts SW72. The winding of relay K71 then remains energized by the voltage across the capacitor C73 despite subsequent release and opening of switch SW73. Insufficient voltage at capacitor C73 de-energizes the winding and permits contacts SW72 to close thereby closing the circuit from source SO through an alarm system A71 corresponding to the alarm A in FIG. 1. A photo-resistor or photo-cell RP7 incorporated into a sensor assembly SA7 and in series with the capacitor R74 connects across the resistor R73.

The coupling resistor R72 behaves as a positive feed-back from the output across the resistor R71 of the emitter-follower connected transistor Q72 back to the transistor Q71. This positive feed-back causes the transistors Q71, Q72 to oscillate depending upon the percentage of the voltage across resistor R71 which is applied at the emitter of transistor Q71. This is in turn determined by the voltage dividing affect of resistors R72 and R73. The bridge-T network R75, C71, R76 is characterized by a sharp attenuation at one particular frequency and freely passes all other frequencies. However, the affect of the circuit from the emitter of transistor Q72 to the base of transistor Q71 is a negative feed-back. Thereby all frequencies of transistor Q71 are heavily damped by this negative feed-back except the highly attenuated frequency which is not fed-back negatively. Thus, of all the positively fed-back frequencies through the resistors R72, the only frequency not bucked out by the negative feed-back is the attenuated frequency of the bridge-T circuit. Thus, the whole circuit will oscillate at one particular frequency.

When the illumination of photo-resistor RP7 is constant the charge across the capacitor C74 will attain a predetermined value. This charge, if reset button switch SW71 has been momentarily depressed, will maintain the winding of relay K1 in the energized condition thereby opening contacts SW2 and preventing alarm A from being energized. A sudden change in the light to which the photo-resistor RP7 is exposed reduces its corresponding resistance and changes the charge of capacitor C74. This is equivalent to providing momentarily a low impedence parallel to the resistor R73. The positive feed-back, because it depends upon the ratio of resistances R72 and the resistance from the emitter Q71 to the line L71, will decrease and the oscillation will stop. The winding of relay K71 at the output of the oscillator is thereby de-energized thus closing contacts SW72 to obtain failure indication by alarm A71.

According to the invention this and all other systems are fail-safe systems because failure indication is noted by absence of signals. Thus, any tampering with the lines will also show failure thereby rendering the units tamper-proof.

The invention contemplates connecting the photo-cell RP7 through the series capacitor C74, to the collector of transmitter Q71. In this case, any variation of light intensity will stop oscillation due to the change in collector-load resistance consisting of resistor R74 in parallel with the photo-resistor connected in series with the capacitor C74. If the light should suddenly increase, the transistor Q1 will be shunted to ground, thereby reducing the loop gained sufficiently to stop oscillation. The oscillator in this circuit is generally designated O70 as outlined by the broken lines.

In FIG. 8 three pairs of parallel connected sensor assemblies, that is to say their photo-resistors are parallel connected, from separated inputs to three oscillators O81, O82 and O83 each corresponding to the oscillator O70. The outputs of the oscillators are connected respectively to transmission lines TL1 and TL2 through respective emitter follower output stages, EF81, EF82, EF83 as well as a common transformer TR81. Each output stage comprises an input resistor R81, a coupling capacitor C81, an emitter follower connected transistor Q81 with its base connected to capacitor C81 and a source of voltage D.C. The sensor assemblies are strategically placed according to a desired pattern and serve for sending an alarm to a remote observation board BO. The lines TL1 and TL2 connect to TR82 to three filters F81, F82 and F83 responding to frequencies of oscillators O81, O82 and O83. The filters connect to three demodulators DM81, DM82 and DM83 which in turn form input signals to respective amplifiers AMP81, AMP82 and AMP83. These amplifiers comprise a direct coupled amplifier comprised of a single transistor Q80 energized by a source S. A winding of a relay K8 in each amplifier serves to throw a corresponding switch and energized alarms A81, A82 and A83.

When one of the sensor assemblies SA has the light to which it is exposed suddenly changed by an intruder, the corresponding oscillators, for example O81, are affected. The effect upon the oscillator O81 is to quench its oscillations during the rapid change in light falling upon the sensor assembly so that the oscillation normally passed by the filters F81 and detected by the demodulator D81 no longer energized the transistor Q80 into conduction. This de-energizes the relay K8 causing its contact to close thereby energizing the associated alarm A81.

Figure 8A:
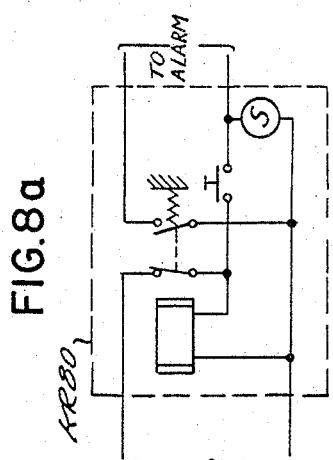
FIG. 8a shows a relay circuit contemplated for use with FIG. 8.

The invention contemplates separately substituting for amplifiers, AMP81, AMP82, and AMP83 the relay circuit of FIG. 7 comprising relay K71, switch SW73 (and source SO). This relay circuit is shown in FIG. 8a and is designated KR80. The appertaining relay is designated K81 and possesses contacts SW81, SW82. The momentary reset button switch is designated SW83.

Figure 9:
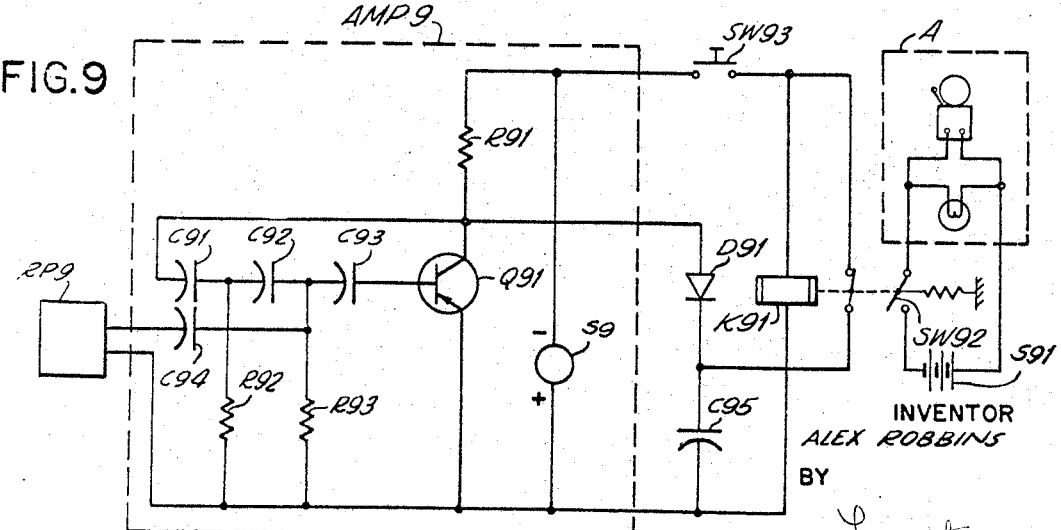
FIG. 9 is a circuit diagram of an oscillator embodying features of this invention corresponding in function to the oscillator of FIG. 7.

FIG. 9 shows another oscillator circuit suitable for use in or as oscillators O81, O82 and O83 in FIG. 8. The oscillator according to FIG. 9 operates at audio frequency and comprises a transistor having a feed-back from collector to its base over a capacitor-resistor phase shift network, C91, C92, C93 and R92, R93. A collector-resistor R91 connects the collector of transistor Q81 to a source S9 also connected to the emitter of transistor Q91. A capacitor C94 connected in series with a photo-resistor RP9 forms a circuit connected to shunt the resistor R93. The photo-resistor RP9 is mounted according to the showing of FIG. 1 within a sensor assembly for supervising a zone. At the frequency at which the phase shift from collector to base over the network comprising of capacitors C91, C92, C93, R91, R92 and the base input impedance, is 180 degrees, the unit will oscillate. The frequency of oscillation can readily be changed by changing the input impedance of the transistor. If any of the resistance values are changed sufficiently to reduce the overall loop gain to less than 1, oscillation will stop. The circuit comprised of capacitor C94 and RP9 changes the resistance values sufficiently, when the photo-resistor RP9 is exposed to a sudden change in illumination to reduce the loop gain and quench oscillation. Connected to the output of the oscillator, that is across the emitter-collector circuit of the transistor Q91 is a filtered rectifier circuit comprising diode D91 and capacitor C95. A relay coil K91 has a winding connected across the source SO through a momentarily-operable manual reset switch SW93. The coil when energized closes a pair of contacts SW91 and opens contacts SW92 both forming part of relay K91. The contacts SW91 when closed connect the coil of K91 across the output of the rectifier circuit, namely across capacitor C95. The contacts SW92 close when the coil of K91 is energized and close a circuit from a direct voltage source S91 through an alarm A. The alarm A comprises a bell and a light.

The relay K91 is originally actuated by momentarily depressing the manual reset switch SW93. If any oscillating signal is received from the oscillator O9 the relay will stay locked over its own normally-open contacts SW91. At the same time the relay will open contacts SW92. If the oscillator output stops for even a very short time the relay will release until it is reset manually.

It should be noted that by placing the photo-cell RP9 parallel to one of the resistors R92 or R93, without using the capacitor C91, the oscillator will be modulated according to the value of light to which the photo-resistor is exposed rather than to changes. The oscillator O9 with the photo-resistor so connected can perform in the circuit of FIG. 6 as oscillators O1, O2, and O3.

The oscillator as shown in FIG. 9 is suitable for replacing the oscillators in FIG. 8 and depending upon the type of filters used it is necessary to separate the frequencies by a minimum spacing. The closer the frequencies to each other, the more expensive the filters to separate them and the more stable the oscillators must be. Preferably, the frequencies of oscillations in FIGS. 8 and 6 of the various oscillators occupy a band from 200 cycles to 20,000 cycles and the frequencies are spaced in geometric progression with a factor of 1.3. This will permit accommodating approximately 20 units each corresponding to the units SA1, SA2 and SA3 in FIG. 6.

Figure 9B:
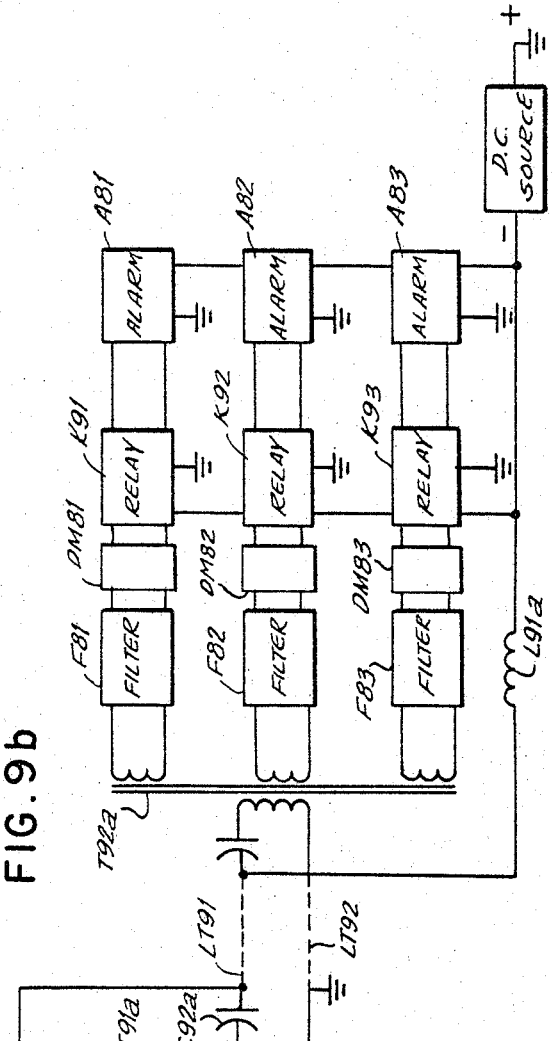
FIGS. 9a and 9b are schematic circuit diagrams showing examples of other two-wire networks for transmitting oscillator signals.
Figure 9B:
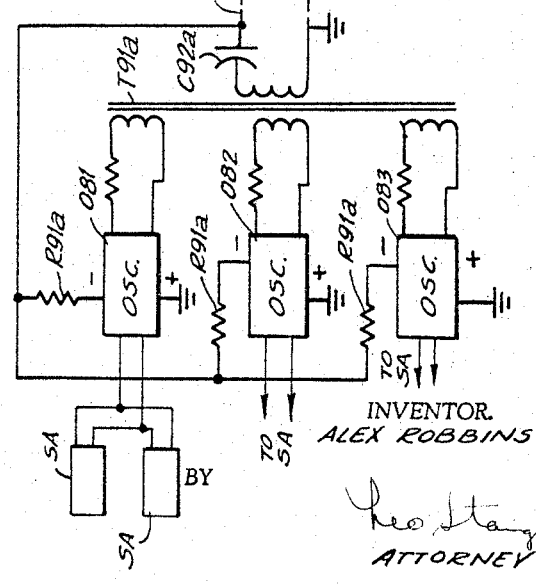
Figure 9A:
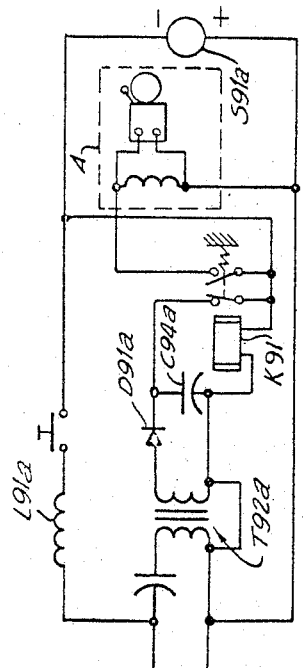

FIG. 9a shows an alternate connection between the oscillator O9 (or an amplifier stage following an oscillator) and a relay alarm. According to the system of FIG. 9a, a two wire line affords transmission of oscillator signals as well as the requisite power DC voltage. An output transformer T91a possesses a primary winding connected to receive signals from the output stage of an oscillator circuit including transistor Q91a. The oscillator circuit belongs to a sensing network, including a photo-resistor, as in FIG. 9, positioned in an appropriate location for supervising an area. A capacitor C92a A-C couples the transformer T91a to a pair of lines TL91a, TL92a which in turn are A-C coupled to a winding of a transformer T92a by a capacitor C93a. Thus, alternating signals are transmitted from the oscillator to the transformer T92a. The transformer T92a energizes with its secondary winding a rectifier circuit composed of diode D91a and capacitor C94a. Connected across a D-C source S91a is a relay K91a identical to the relay K91 and connected to the capacitor C94a as is the relay K91 to its capacitor. Its normally closed alarm contacts SW92a (identical with contacts SW92) connect an alarm A in series with the source S91a when the oscillator stops oscillating. The source S91a also energizes the oscillator through an inductor L91a, the lines TL91a, TL92a, and a resistor R91a connected to bypass the coupling capacitors C92a, C93a. The inductor L91a and resistor R91a provide impedance in the supply lead to prevent shorting the A-C signal voltage. These impedances may be either inductive or resistive depending upon the current and impedance level in the system.

The resistance on the oscillator is acceptable because of the low oscillator drain. The inductance L91a is necessary to provide high A-C reactance with low D-C voltage drop. The invention also contemplates using the connection of FIG. 9a in FIGS. 6 and 8. In this embodiment separate primary windings from oscillators (e.g. O81, O82) interlink with the single secondary of T91a and separate D-C coupling impedances (e.g. R91a) provide DC power to the oscillators. Similarly T92a possess, when applied to the transmission lines of FIGS. 6 and 8, separate secondary windings inductively interlinked with the primary and connecting to the separate filters (e.g. F81, F82). (See FIG. 9b.)

For installations requiring recognition of more than the above number of units, the invention contemplates providing two or more oscillators in connection with each sensor assembly or parallel connected sensor assemblies together with two or more corresponding filters. Various combinations of frequencies can be applied for each sensor assembly and in detecting oscillation of the oscillators at the supervisory board the corresponding demodulated filters can be connected to the respective amplifiers with logical AND circuits. Such a circuit is shown in FIG. 11. Four area-supervising sensors RP111, RP112, RP113, RP114 respectively actuate four pairs of oscillators O111 and O112, O113 and O114, O115 and O116, O117 and O118, operable at frequencies of 200, 300, 300, 500, 200, 700, 500 and 700 cycles respectively. The oscillators, corresponding to that described in FIG. 7 or 9, include output isolating stages such as emitter follower stages for preventing loading and are connected in parallel. A transformer TR11 connects the parallel-connected oscillators O111 to O118 to a remote supervisory control station through transmission lines TL111, TL112. At the remote station a transformer TR112 connects the lines TL111, TL112 to four filters F111, to F114 corresponding in response to the four frequencies present at the sensors, namely 200, 300, 500 and 700 cycles. The filters connect through resistors R111 to R114 and R111a to R114a to four logical AND circuits according to the combinations in the oscillators O111 to O118. That is to say the following pairs of filter frequencies connect to the same respective AND circuits: 200 and 300 cycles, 300 and 500 cycles, 200 and 700 cycles, and 500 and 700 cycles. The AND circuits comprise transistors Q111 and Q112, Q113 and Q114, Q115 and Q116, Q117 and Q118 respectively.

Each AND circuit will be actuated only if a pair of frequencies, for example 200 and 300 cycles, or 300 and 500 cycles, or 200 and 700 cycles, or 500 and 700 cycles are actuated simultaneously. Each AND circuit preferably comprises two transistors having their respective emitter-collector circuits connected in series. Each base connects to the filter or frequency discriminator corresponding to one of the pair of frequencies to be combined according to the oscillator combinations. The outputs of the AND circuits connect to separate alarms A. They actuate these alarms only if one of the corresponding oscillators has its output quenched by a moving intruder.

Of course the invention is not limited to the frequency band between 200 cycles and 20,000 cycles as mentioned above. Preferably certain precautions are observed. For example different frequencies should not be harmonically related to each other, thereby eliminating the possibility that higher harmonics of some frequencies will be recorded instead of the correct desired frequency.

In the circuit shown deactuating of the relay by a moving object merely requires reactuation by resetting. On the other hand, cutting of wires prevents resetting of the relay.

The photo-resistor or photo-cell RP used herein is preferably of the cadmium sulphite type. However, the invention is not limited thereto because other photo-sensors are suitable.

Figure 10:
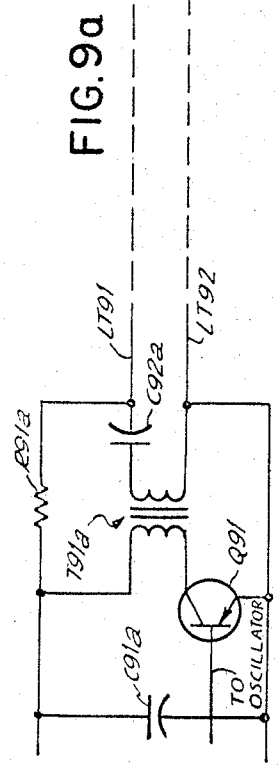
FIG. 10 is a cross-sectional, partly schematic view of an electro-optical alarm system according to the invention having a different sensor assembly than that shown in FIG. 1.
Figure 10:
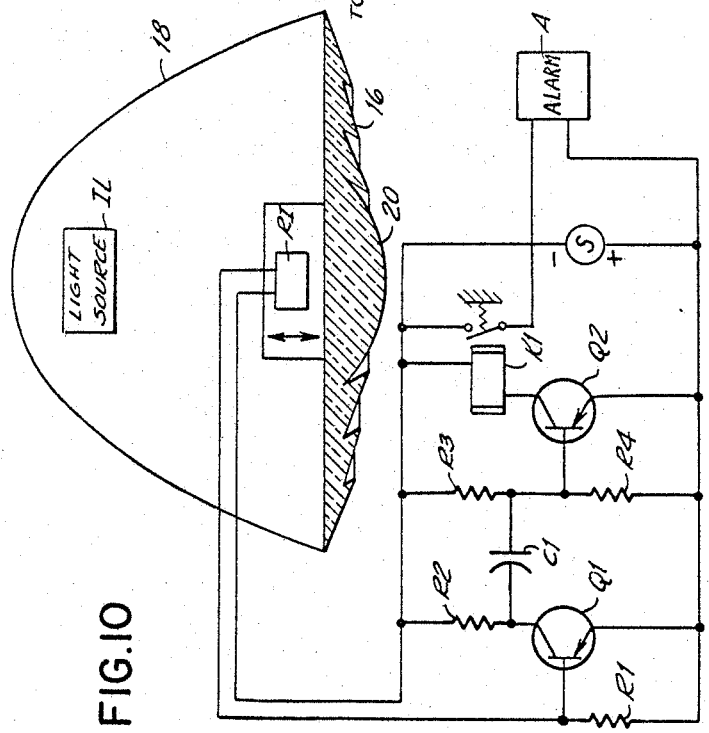

FIG. 10 illustrates a sensor assembly for use where ambient light is at times so dim as to be incapable of actuating a photo-resistor. In FIG. 10 a photo-resistor R1 is responsive to infra-red illumination and moveable up or down along the axis of a lens 16 secured at its edges to a reflector 18. The lens 16 is provided with annular grooves and possesses at its center a lens portion 20 for directing the rays of light toward the photo-cell and an outer Fresnel lens portion for directing outwardly the illuminating rays from the light source IL. The source IL connected along the axis of the lens 16 but behind the axially moveable photo-cell RI. Suitable electrical means not further shown serve for energizing the light source. The photo-resistor RI is connected between the lead L1 and the base of transistor Q1 in a circuit otherwise identical with the circuit of FIG. 1. In using the system according to FIG. 10 it is advisable to use infra-red inhibiting filters over the windows to prevent interference from outside sources.

The invention contemplates using the disclosed embodiments of the invention for fire and smoke detection. For this purpose the time dependent circuit elements (e.g. C1 etc.) are chosen to be longer. For example they are given values so that variations of less than 3 minutes duration (a man walking through an area) will remain undetected whereas slower variations would set off the alarm. Also the invention contemplates variations of great amplitude as would be caused by fire or smoke setting off the alarm. Also the invention contemplates substituting for the capacitor C1 between the amplifier stages of FIG. 1 a band-pass filter having respective high and low cut-offs of 10 minutes and 3 minutes.

While various embodiments of the invention have been illustrated and described in detail it will be obvious to those skilled in the art that the invention may be otherwise embodied within the scope of the appended claims.

What is claimed is:

1. A monitor system comprising a plurality of photo electric sensors, a plurality of indicator means each corresponding to a sensor and located remotely from said sensors, and circuit means connecting said sensors to said indicator means; said circuit means including a multiplicity of oscillators connected to each sensor to be modulated thereby, the oscillators in each multiplicity connected to each sensor having different combination of separate frequencies; a pair of transmission lines connected at one end to all of said oscillators, a plurality of filters corresponding to the individual frequencies of said oscillators and connected to said transmission lines at their other end, and a plurality of logical AND circuit means each corresponding to one of the sensors and each having inputs connected to those filters responding to the frequencies of the oscillators connected to the corresponding sensor; each of said AND circuit means having an output connected to one of said indicator means.

2. A monitor system comprising a plurality of photo electric sensors, a plurality of indicator means each corresponding to a sensor and located remotely from said sensors, and circuit means connecting said sensors to said indicator means; said circuit means including a multiplicity of oscillators connected to each sensor to be modulated thereby, the oscillators in each multiplicity connected to each sensor having different combination of separate frequencies; a pair of transmission lines connected at one end to all of said oscillators, a plurality of filters corresponding to the individual frequencies of said oscillators and connected to said transmission lines at their other end, and a plurality of logical AND circuit means each corresponding to one of the sensors and each having inputs connected to those filters responding to the frequencies of the oscillators connected to the corresponding sensor; each of said AND circuit means each having an output connected to one of said indicator means; said circuit means having high-pass filter network means for each respective sensor to respond to only changes in the outputs of said sensors which vary at predetermined rates.

References Cited

UNITED STATES PATENTS

| | | | |
|---|---|---|---|
| 1,917,245 | 7/1933 | Edwards | 340—258 |
| 2,041,114 | 5/1936 | Carini | 331—66 X |
| 2,177,843 | 10/1939 | Seeley. | |
| 2,154,480 | 4/1939 | Toporeck. | |
| 2,234,011 | 3/1941 | Shepard. | |
| 2,312,127 | 2/1943 | Shepard | 340—310 |
| 2,636,163 | 4/1953 | Gardiner | 340—228 |
| 2,764,355 | 9/1956 | Machlet | 331—66 X |
| 3,056,106 | 9/1962 | Hendricks. | |
| 3,138,357 | 6/1964 | Whitwell | 340—228 X |
| 3,142,832 | 7/1964 | Horne. | |
| 3,135,951 | 6/1964 | Byrne | 340—258 X |

FOREIGN PATENTS 309,837  8/1930  England.
844,940  8/1960  England.

OTHER REFERENCES

Industrial Electronic Eng. and Maintenance, Lytell, vol. 7, No. 5, May 1963, pp. 20–33.

NEIL C. READ, *Primary Examiner.*

R. M. GOLDMAN, D. L. TRAFTON,
*Assistant Examiners.*